(12) United States Patent
Li et al.

(10) Patent No.: US 12,402,071 B2
(45) Date of Patent: *Aug. 26, 2025

(54) APPARATUS, METHOD, AND MEDIUM FOR MOBILE ACCESS POINT STATION

(71) Applicant: Apple Inc., Cupertino, CA (US)

(72) Inventors: Guoqing Li, Campbell, CA (US); Dagbegnon H. Bahini, Livermore, CA (US); Rajneesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,980

(22) Filed: Jun. 7, 2021

(65) Prior Publication Data

US 2021/0368436 A1 Nov. 25, 2021

Related U.S. Application Data

(63) Continuation of application No. 16/286,156, filed on Feb. 26, 2019, now Pat. No. 11,032,763.

(Continued)

(51) Int. Cl.
*H04W 52/02* (2009.01)
*H04W 72/1263* (2023.01)
(Continued)

(52) U.S. Cl.
CPC ... *H04W 52/0206* (2013.01); *H04W 52/0216* (2013.01); *H04W 72/1263* (2013.01);
(Continued)

(58) Field of Classification Search
CPC ............. H04W 52/0206; H04W 76/28; H04W 72/1252; H04W 72/1289; H04W 88/08;
(Continued)

(56) References Cited

U.S. PATENT DOCUMENTS 10,194,391 B2 1/2019 Asterjadhi et al.
11,032,763 B2 6/2021 Li et al.
(Continued)

FOREIGN PATENT DOCUMENTS

CN 101120539 A 2/2008
CN 105813077 A 7/2016
(Continued)

OTHER PUBLICATIONS

Office Action directed to related Chinese Patent Application No. 201910548758.1, mailed Nov. 3, 2021, with attached English-language translation; 16 pages.
(Continued)

*Primary Examiner* — Omar J Ghowrwal
(74) *Attorney, Agent, or Firm* — Sterne, Kessler, Goldstein & Fox P.L.L.C.

(57) ABSTRACT

Some embodiments include an apparatus and method for a mobile access point (AP) station that operates in an always-on soft AP mode where a station is associated with the mobile AP station, and switch back to operate as a station in an infrastructure mode with an AP. For example, in an always-on soft AP mode, the mobile AP station may implement a target wake time (TWT) responder power save mode feature. The mobile AP station may maintain a wake window after a beacon to enable unassociated devices to associate; establish a broadcast TWT schedule for unassociated TWT-capable devices to associate; schedule TWT for associated devices; go to sleep outside of the scheduled TWT of the associated devices; and switch back to infrastructure mode to perform as a station and maintain a connection with an AP.

20 Claims, 5 Drawing Sheets

Related U.S. Application Data

(60) Provisional application No. 62/692,562, filed on Jun. 29, 2018.

(51) Int. Cl.
*H04W 72/23* (2023.01)
*H04W 72/52* (2023.01)
*H04W 76/28* (2018.01)
*H04W 88/08* (2009.01)

(52) U.S. Cl.
CPC ........... *H04W 72/23* (2023.01); *H04W 72/52* (2023.01); *H04W 76/28* (2018.02); *H04W 88/08* (2013.01); *Y02D 30/70* (2020.08)

(58) Field of Classification Search
CPC ......... H04W 52/0216; H04W 72/1263; H04W 72/23; H04W 72/52; Y02D 30/70
See application file for complete search history.

(56) References Cited

U.S. PATENT DOCUMENTS

| | | | |
|---|---|---|---|
| 2011/0306372 | A1 | 12/2011 | Ferris et al. |
| 2015/0334759 | A1 | 11/2015 | Hiramatsu |
| 2016/0219510 | A1 | 7/2016 | Asterjadhi et al. |
| 2016/0219512 | A1 | 7/2016 | Asterjadhi et al. |
| 2017/0164371 | A1 | 6/2017 | Kim et al. |
| 2017/0265130 | A1* | 9/2017 | Kakani ................. H04W 48/10 |
| 2017/0339680 | A1 | 11/2017 | Jia et al. |
| 2018/0332534 | A1 | 11/2018 | Hou et al. |
| 2019/0274147 | A1 | 9/2019 | Yang et al. |
| 2019/0306790 | A1 | 10/2019 | Kottontavida et al. |
| 2019/0320388 | A1 | 10/2019 | Li et al. |
| 2020/0008141 | A1 | 1/2020 | Li et al. |

FOREIGN PATENT DOCUMENTS

| | | |
|---|---|---|
| CN | 106998582 A | 8/2017 |
| CN | 107211371 A | 9/2017 |
| CN | 108093478 A | 5/2018 |
| WO | WO 2006052214 A1 | 5/2006 |
| WO | WO 2017/164685 A1 | 9/2017 |
| WO | WO2018/000383 A1 | 1/2018 |

OTHER PUBLICATIONS

Office Action directed to related Indian Patent Application No. 201914022052, mailed Oct. 27, 2020; 6 pages.

Asterjadhi, A., " Comment resolution for 27.7.2 (Block 1)," IEEE Draft doc.: IEEE 802.11-17/0295r1, retrieved from Internet: https://mentor.ieee.org/802.11/dcn/17/11-17-0295-01-00ax-lb225-mac-cr-twt-subclause-27-7-block-1.docx, 11 pages, May 2017.

Asterjadhi, A., "Comment resolution for TWT opeation," IEEE Draft doc.: IEEE 802.11-16/1189r2, retrieved from Internet: https://mentor.ieee.org/802.11/dcn/16/11-16-1189-02-00ax-cc0-twt-operation.docx, 19 pages, Sep. 2016.

Patil, A., "Resolution for CIDs related to Random Access," IEEE Draft doc.: IEEE 802.11-18/0742r3, retrieved from Internet: https://mentor.ieee.org/802.11/dcn/18/11-18-0742-03-00ax-cids-related-to-random-access.docx, 5 pages, May 2018.

Extended European Search Report, dated Sep. 3, 2019, for European Patent Appl. No. 19179239.9, 9 pages.

First Office Action directed to related Chinese Patent Application No. 202210787723.5, mailed Nov. 27, 2024, with attached English-language machine translation; 20 pages.

IEEE Standard for Information technology—Telecommunications and information exchange between systems Local and metropolitan area networks-Specific requirements—Part 11: Wireless LAN Medium Access Control (MAC) and Physical Layer (PHY) Specifications, in IEEE Std 802.11-2016 (Revision of IEEE Std 802.11-2012) , vol. No., pp. 1-3534, Dec. 14, 2016, doi: 10.1109/IEEESTD.2016.7786995.

* cited by examiner

APPARATUS, METHOD, AND MEDIUM FOR MOBILE ACCESS POINT STATION

CROSS-REFERENCE TO RELATED APPLICATIONS

This application claims priority to U.S. patent application Ser. No. 16/286,156, filed on Feb. 26, 2019, entitled, Apparatus, Method, and Medium for Implementing a Target Wake Time, which claims benefit of U.S. Provisional Application No. 62/692,562, filed on Jun. 29, 2018, entitled, Apparatus and Method for a Mobile Access Point Station, which are both incorporated herein by reference in their entireties.

BACKGROUND

Field

The described embodiments generally relate to channel access in wireless communications.

Related Art

A wireless local area Network (WLAN) access point (AP) transmits infrastructure traffic, is always active, and can be reached whenever associated or unassociated stations choose to communicate with the AP. Being always active, the AP operates in an always-on mode and cannot go into a power-save mode. A mobile device may perform soft AP functions that enable other devices to access a network. Like an AP, a soft AP should be always-on so that associated or unassociated stations can communicate with the soft AP. Thus, a soft AP cannot enter a power save mode. But the mobile device performing soft AP functions is battery-operated, and being always-on causes excessive power consumption on the battery. Consequently, a soft AP function on a mobile device is turned on by a user for a given period and then turned off. Further, a mobile device can operate as a station in infra-structure mode to transmit infrastructure traffic with an AP. But, once soft AP functions on a mobile device are turned on, the mobile device cannot switch back to infrastructure mode as a station to communicate with the AP; this is because a soft AP is required to be always available to associated stations.

SUMMARY

Some embodiments include an apparatus and method for a mobile access point (AP) station. A mobile AP station is a mobile device that operates in an always-on soft AP mode that provides soft AP mode functions, and is capable of switching back to infrastructure mode to operate as an associated station in an infrastructure mode with an AP. For example, the mobile AP station may implement a target wake time (TWT) responder power save mode feature with stations associated with the mobile AP station. The mobile AP station may: maintain a wake window after each beacon or one or more selected beacons to allow unassociated devices to communicate with the mobile AP station; establish a broadcast TWT schedule for unassociated TWT-capable devices to communicate with the mobile AP station; schedule TWT for associated devices; go to sleep outside of the scheduled TWT of the associated devices; and concurrently perform as a station and maintain a connection (e.g., wireless local area network (WLAN) access) with an AP. Thus, a mobile AP station in an always-on soft AP mode may: go to sleep, switch back to infrastructure mode and communicate infrastructure traffic to the AP, switch back to operate in a soft AP mode and communicate with of one of the associated devices of the mobile AP station at a scheduled TWT, or remain active.

Some embodiments include a mobile AP station that may operate in an always-on soft AP mode that includes implementing a TWT responder power save mode. While operating in the always-on soft AP mode, the mobile AP station may enable a first station to associate with the mobile AP station, and while the first station is associated with the mobile AP station, switch back to infrastructure mode to transmit infrastructure traffic to an AP. In addition, the mobile AP station may implement a broadcast TWT schedule, and advertise the broadcast TWT schedule in a beacon. The broadcast TWT schedule indicates a service period during which an unassociated TWT-capable station (e.g., an IEEE 802.11ax device) may wake at a known time window (e.g., when the mobile AP station is available) to associate with the mobile AP station. The mobile AP station may also enable the first station to request setting up a TWT for the first station by setting a TWT Required field to a predetermined value (e.g., "1") in a high efficiency operation element in a beacon. In response to the TWT Required field being set to the predetermined value (e.g., "1"), the mobile AP station receives a TWT setup request from the first station, and in response to the TWT setup request received, transmits a TWT schedule to the first station. The mobile AP station may inform the first station that the mobile AP station is not available outside of the TWT schedule by setting a TWT Responder Power Save field in a TWT Element, and transmitting the TWT element to the first station. The mobile AP station may enter a sleep mode outside of the TWT for the first station, remain active outside of the TWT for the first station, or dynamically adjust the TWT for the first station. Dynamically adjusting the TWT for the first station may be based in part on a number of stations associated with the mobile AP station, a traffic load between the mobile AP station and one or more stations associated with the mobile AP station, and/or the infrastructure traffic between the mobile AP station and the AP. The mobile AP station may set up a wake window during which new unassociated stations may join a network of the mobile AP station that includes the first station, and where the wake window is temporally adjacent to a beacon. The mobile AP station may dynamically adjust the wake window based at least in part on a number of stations associated with the mobile AP station.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
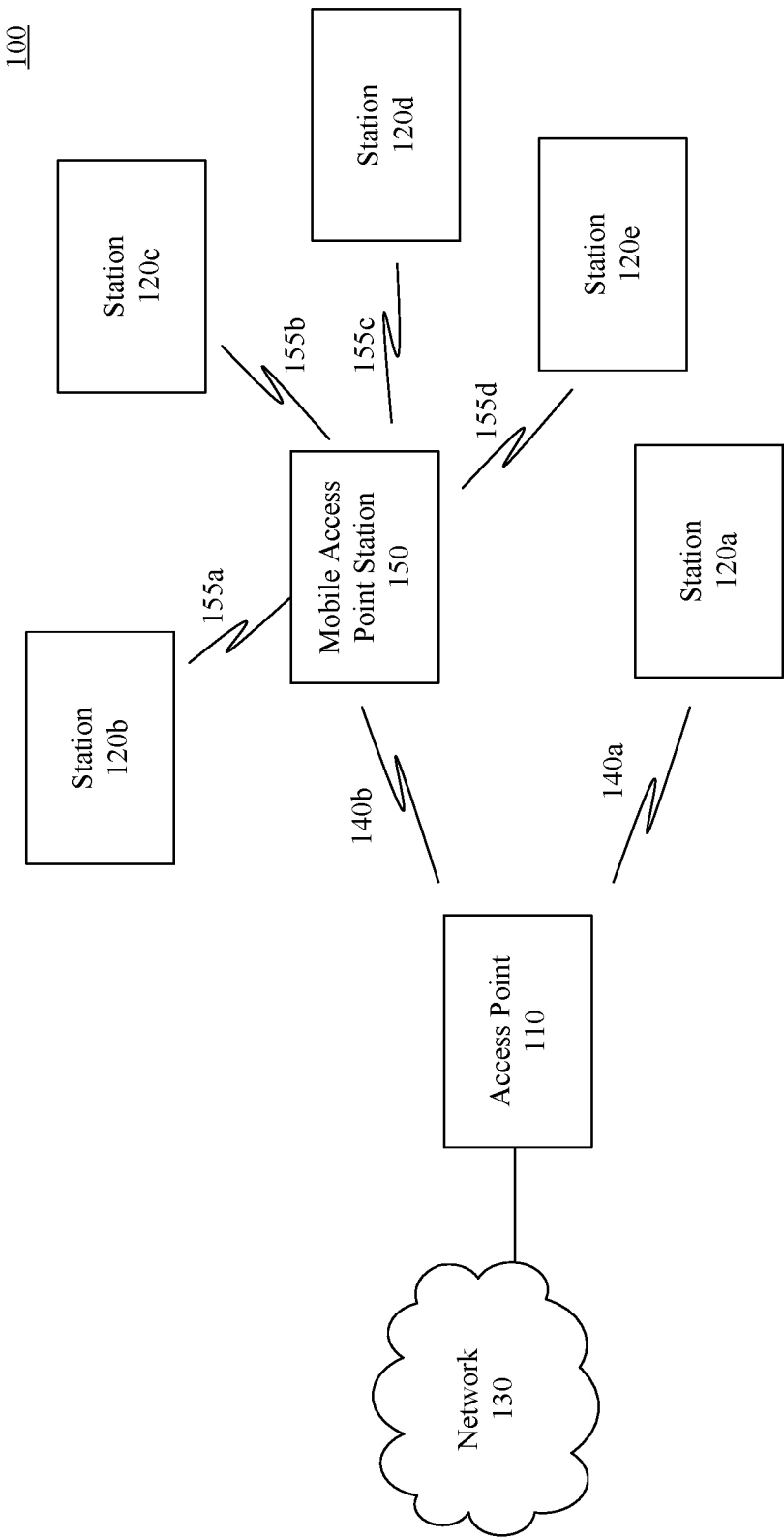
FIG. 1 illustrates an example system implementing a mobile access point (AP) station, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include an apparatus, method, and computer program product for a mobile access point (AP) station that operates in an always-on soft AP mode where a station is associated with the mobile AP station, and operate as a station in an infrastructure mode with an AP. For example, in an always-on soft AP mode, the mobile AP station may implement a target wake time (TWT) responder power save mode feature. The mobile AP station may maintain a wake window after a beacon to enable unassociated devices to associate; establish a broadcast TWT schedule for unassociated TWT-capable devices to associate; schedule TWT for associated devices; go to sleep outside of the scheduled TWT of the associated devices; and perform as a station and maintain a connection with an AP (e.g., to transmit infrastructure traffic to the AP.)

FIG. 1 illustrates an example system 100 implementing a mobile access point (AP) station 150, according to some embodiments of the disclosure. A mobile AP station 150 is different than a conventional mobile device that performs soft AP functions. Example system 100 is provided for the purpose of illustration only and is not limiting of the disclosed embodiments. System 100 may include but is not limited to stations 120, access point (AP) 110, network 130, and mobile AP station 150. Stations 120a-120e may include but are not limited to WLAN stations such as wireless communication devices, smart phones, laptops, desktops, tablets, personal assistants, monitors, and televisions. Stations 120 may support latency sensitive applications (e.g., video and/or audio streaming). AP 110 may include but are not limited to WLAN electronic devices such as a wireless router, a wearable device (e.g., a smart watch), a wireless communication device (e.g., a smart phone), or a combination thereof. Network 130 may be the Internet and/or a WLAN. Infrastructure mode communications are shown as wireless communications 140. Soft AP mode communications are shown as wireless communications 155. Mobile AP station 150 may include but is not limited to WLAN stations such as wireless communication devices, smart phones, laptops, tablets, personal assistants, monitors, and televisions.

Mobile AP station 150 operates in an always-on soft AP mode, and is capable of switching back to infrastructure mode to operate as a station in an infrastructure mode with AP 110. Since mobile AP station 150 operates in an always-on soft AP mode, stations 120b-120e may always discover mobile AP station 150. Stations 120b-120e may associate with mobile AP station 150 and join a network of mobile AP station 150. Concurrent to being in the always-on soft AP mode where a station (e.g., 120b) is associated with mobile AP station 150, mobile AP station 150 can switch back to infrastructure mode to operate as a station in an infrastructure mode, and may transmit and/or receive infrastructure traffic shown as 140b to AP 110. Mobile AP station 150 may use any mechanism such as a Power Management bit in a MAC packet header to inform AP 110 that mobile AP station 150 is going to sleep before switching back to perform soft AP functionality with other devices such as stations 120a-120c. A mobile AP station by default may be in always-on soft AP mode. A user may change a setting, such as manually turning off the always-on soft AP mode.

In some embodiments, when mobile AP station 150 operates in infrastructure mode as a station with AP 110, mobile AP station 150 may arrange a target wake time (TWT) for infrastructure mode with AP 110, or AP 110 may arrange a TWT with mobile AP station 150. Outside of these arranged TWTs with AP 110, mobile AP station 150 may switch back to perform soft AP functionalities with stations 120a-120c that are associated with mobile AP station 150.

Figure 2:
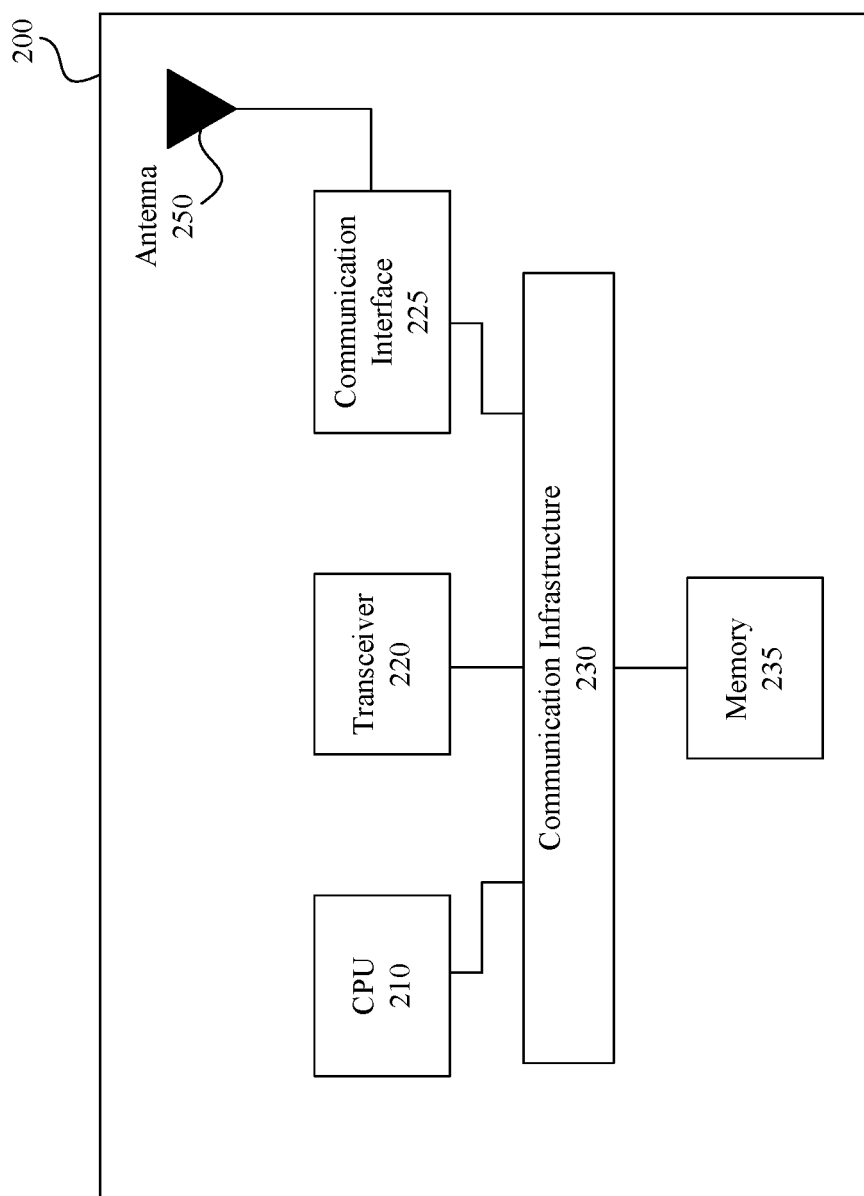
FIG. 2 illustrates a block diagram of an example wireless system for a mobile AP station, according to some embodiments of the disclosure.

FIG. 2 illustrates a block diagram of an example wireless system 200 of a system 100 implementing a mobile AP station, according to some embodiments of the disclosure. System 200 may be any of the electronic devices (e.g., AP 110, station 120, mobile AP station 150) of system 100. System 200 includes central processing unit (CPU) 210, transceiver 220, communication interface 225, communication infrastructure 230, memory 235, and antenna 250. Memory 235 may include random access memory (RAM) and/or cache, and may include control logic (e.g., computer software) and/or data. CPU 210 together with instructions stored in memory 235 performs operations enabling a wireless system 200 of a system 100 implementing a mobile AP station. Transceiver 220 transmits and receives communications signals that support mobile AP station functions according to some embodiments, and may be coupled to antenna 250. Communication interface 225 allows system 200 to communicate with other devices that may be wired and/or wireless. Communication infrastructure 230 may be a bus. Antenna 250 may include one or more antennas that may be the same or different types.

Some embodiments enable a mobile AP station to implement a Target Wake Time (TWT) protocol as a TWT responder, and utilize TWT Responder Power Save Mode features. Using the TWT protocol enables the mobile AP station to remain in the always-on soft AP mode and concurrently maintain a connection with an AP as a station in an infrastructure mode. For example, a mobile AP station may utilize the TWT protocol to: set an individual TWT service period for an associated station to access the medium (e.g., WLAN medium access); and/or arrange for the mobile AP station to go to sleep outside of a TWT service period. When a mobile AP station goes to sleep (e.g., enters a power save mode) transmissions from unassociated stations may be missed. To avoid missing transmissions from unassociated stations, a mobile AP station may stay active for some time after a beacon or selected beacons. The stay active time may be called a wake window for unassociated stations. During a wake window for unassociated stations, the mobile AP station is active and may receive communications from stations such as 802.11 legacy devices and/or TWT-capable devices. The duration of the wake window for unassociated stations can be dynamically adjusted based on a number of stations currently associated with the mobile AP station. For example, when no stations are associated with the mobile AP station, the wake window for unassociated stations can be set to a longer time than when a station is associated. The longer time may increase the chances of unassociated stations being able to join a network of the mobile AP station.

Conversely, when many stations are associated with the mobile AP station, the wake window for unassociated stations may be reduced to limit congestion, for example.

Since 802.11 legacy devices do not support TWT capabilities, when an 802.11 legacy device associates with the mobile AP station, the mobile device exits mobile AP station functions.

In addition to a wake window for unassociated stations, a mobile AP station may set up a broadcast TWT schedule and advertise a broadcast TWT service period in a beacon to help TWT-capable devices conserve power usage. For example, TWT-capable devices that receive the beacon can remain asleep until the broadcast TWT service period. The TWT-capable devices may wake during the broadcast TWT to associate with the mobile AP station. Thus, a TWT-capable device may remain asleep and may not have to contend with 802.11 legacy devices during a wake window for unassociated station time period.

Figure 3:
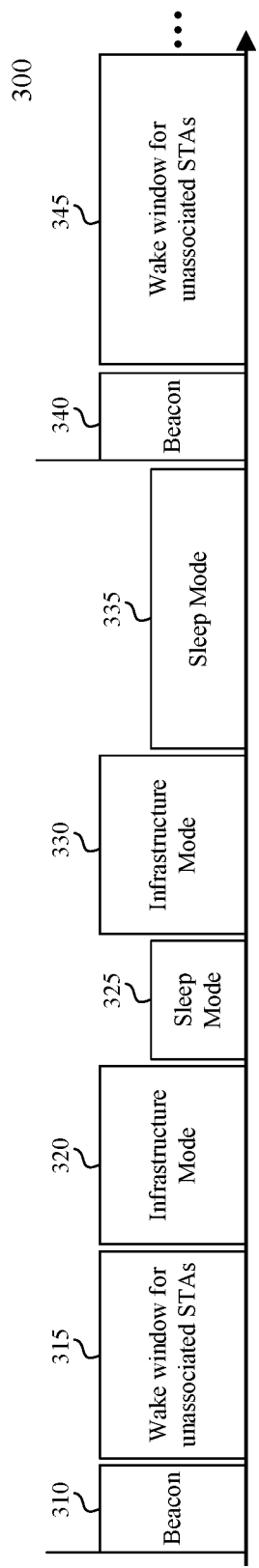
FIG. 3 illustrates an example operation of a mobile AP station with no associated devices, according to some embodiments of the disclosure.

FIG. 3 illustrates an example operation 300 of a mobile AP station with no associated devices, according to some embodiments of the disclosure. As a convenience and not a limitation, FIG. 3 may be described with regard to elements of FIG. 1. Operation 300 may represent the operation of mobile AP station 150 when devices 120b-120e are not associated with mobile AP station 150, and mobile AP station 150 transmits infrastructure traffic to AP 110. Operation 300 includes beacons 310 and 340, wake windows for unassociated stations 315 and 345, infrastructure modes 320 and 330, and sleep mode 325 and 335.

During operation, mobile AP station 150 operates in an always-on soft AP mode and transmits beacon 310. Subsequent to transmitting beacon 310, mobile AP station 150 remains active for a duration of wake window for unassociated stations 315 to give 802.11 legacy devices as well as unassociated TWT-capable devices an opportunity to associate with mobile AP station 150. Mobile AP station 150 may switch to infrastructure mode 320 and transmit and/or receive communications from AP 110, then go into a power save mode at sleep mode 325. After sleep mode 325, mobile AP station 150 may wake to exchange infrastructure traffic again with AP 110 during infrastructure mode 330, and return to sleep at sleep mode 335. At the start of the next period, mobile AP station 150 transmits beacon 340 and may dynamically change a duration of wake windows for unassociated stations 345, based on a number of associated stations 120. In this example, no stations 120 are associated so mobile AP station 150 may remain awake longer to allow unassociated stations 120 to join a network that includes mobile AP station 150. Thus, mobile AP station 150 may extend wake window for unassociated stations 345 to be longer than wake window for unassociated stations 315.

Figure 4:
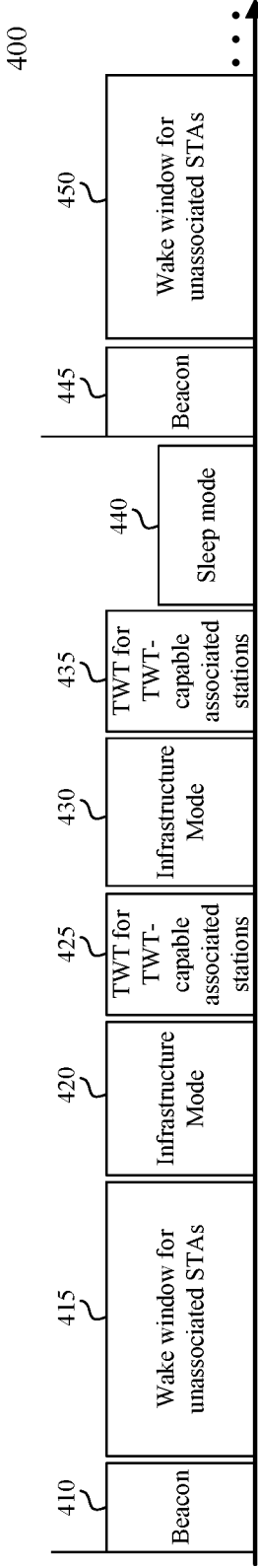
FIG. 4 illustrates an example operation of a mobile AP station with associated devices, according to some embodiments of the disclosure.

FIG. 4 illustrates an example operation 400 of a mobile AP station with associated devices, according to some embodiments of the disclosure. As a convenience and not a limitation, FIG. 4 may be described with regard to elements of FIGS. 1 and 3. Operation 400 may represent the operation of mobile AP station 150 when devices 120b-120d are associated with mobile AP station 150, and mobile AP station 150 is able to switch back to infrastructure mode to transmit infrastructure traffic to AP 110. Operation 400 includes beacons 410 and 445, wake windows for unassociated stations 415 and 450, infrastructure modes 420 and 430, TWT for TWT-capable associated stations 425 and 435, and sleep mode 440. Mobile AP station 150 operates in an always-on soft AP mode and transmits beacon 410. Mobile AP station 150 remains awake for the duration of wake window for unassociated stations 415, and switches to infrastructure mode 420 to exchange infrastructure traffic with AP 110. Subsequently, during TWT for TWT-capable associated stations 425, mobile AP station 150 may exchange soft AP traffic with TWT-capable associated stations, such as stations 120b-120d. For example, stations 120b-120d may contend for access or exchange soft AP traffic as allocated, during TWT for TWT-capable associated stations 425. Mobile AP station 150 may switch to infrastructure mode 430 and exchange infrastructure traffic with AP 110, and during TWT for TWT-capable associated stations 435, exchange soft AP traffic with one or more of associated stations 120b-120d. Mobile AP station 150 may enter a power save mode during sleep mode 440. In the next period, mobile AP station 150 may transmit beacon 445 and implement wake window for unassociated stations 450. Mobile AP station may dynamically adjust the active time after beacon 445 based at least on the number of associated stations 120b-120d. For example, the time for wake window for unassociated stations 450 may be reduced compared to wake window for unassociated stations 415.

Figure 5:
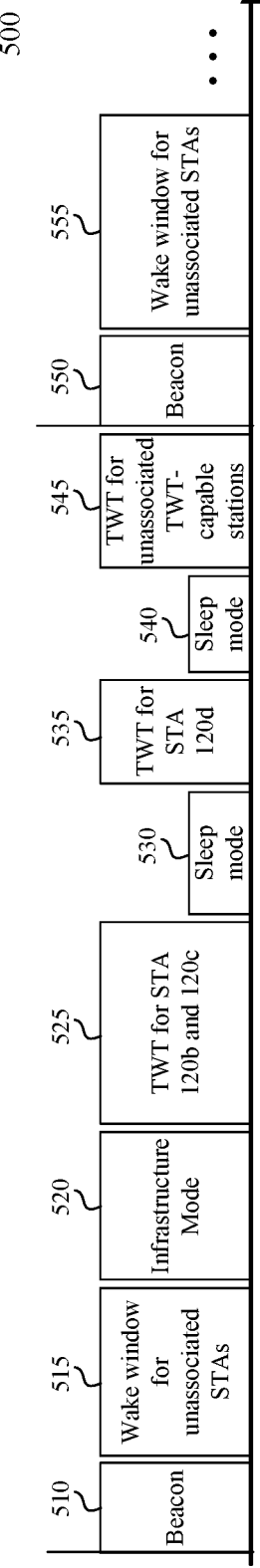
FIG. 5 illustrates an example operation of a mobile AP station with unassociated target wake time (TWT)-capable devices, according to some embodiments of the disclosure.

FIG. 5 illustrates an example operation 500 of a mobile AP station with unassociated TWT-capable devices, according to some embodiments of the disclosure. As a convenience and not a limitation, FIG. 5 may be described with regard to elements of FIGS. 1, 3, and 4. Operation 500 may represent the operation of mobile AP station 150 when devices 120b-120d are associated with mobile AP station 150, device 120e is a TWT-capable device that is not associated with mobile AP station 150, and mobile AP station 150 is able to switch back to infrastructure mode to transmit infrastructure traffic to AP 110. Operation 500 includes beacons 510 and 550, wake windows for unassociated stations 515 and 555, infrastructure mode 520, and sleep modes 530 and 549. Mobile AP station 150 may group associated stations 120b-120d to different TWT periods to reduce contention in a TWT period. In operation 500, stations 120b and 120c may be assigned to TWT for associated stations 425 and station 120d may be assigned to TWT for associated station 535. Mobile AP station 150 may arrange a broadcast TWT schedule that is advertised in beacon 510. Unassociated TWT-capable stations like station 120e may receive the broadcast TWT schedule and remain asleep until a broadcast TWT service period such as TWT for unassociated TWT-capable stations 545.

In operation 500, Mobile AP station 150 operates in an always-on soft AP mode and transmits beacon 510. Mobile AP station 150 remains awake for the duration of wake window for unassociated stations 515, and switches to infrastructure mode 520 to exchange infrastructure traffic with AP 110. Subsequently, during TWT for TWT-capable associated stations 525, mobile AP station 150 may exchange soft AP traffic with TWT-capable associated stations 120b and 120c. For example, stations 120b and 120c may contend for access or exchange soft AP traffic as allocated, during TWT for TWT-capable associated stations 525. Mobile AP station 150 may enter and remain in a power save mode for sleep mode 530, and then exchange soft AP traffic during TWT for TWT-capable associated stations 535 with associated station 120d. Mobile AP station 150 may enter and remain in a power save mode during sleep mode 540. At TWT for unassociated TWT-capable stations 545, mobile AP station 150 may remain active to enable unassociated TWT-capable stations like station 120e to join the network of mobile AP station 150.

Based on the activity in the period such as station 120e associating with mobile AP station 150, mobile AP station 150 may adjust the time period of wake window for unassociated stations 555 and/or a duration of the next TWT for unassociated TWT-capable stations time period. Mobile AP station 150 may also assign station 120e to TWT for station 525 or 535. Mobile AP station 150 may also adjust the TWT schedule as well as a duration of the infrastructure mode based on any/all of: a number of stations associated with mobile AP station 150, a soft AP traffic load of the associated stations 120 associated with mobile AP station 150, and/or an infrastructure traffic load of mobile AP station 150 and AP 110.

Figure 6:
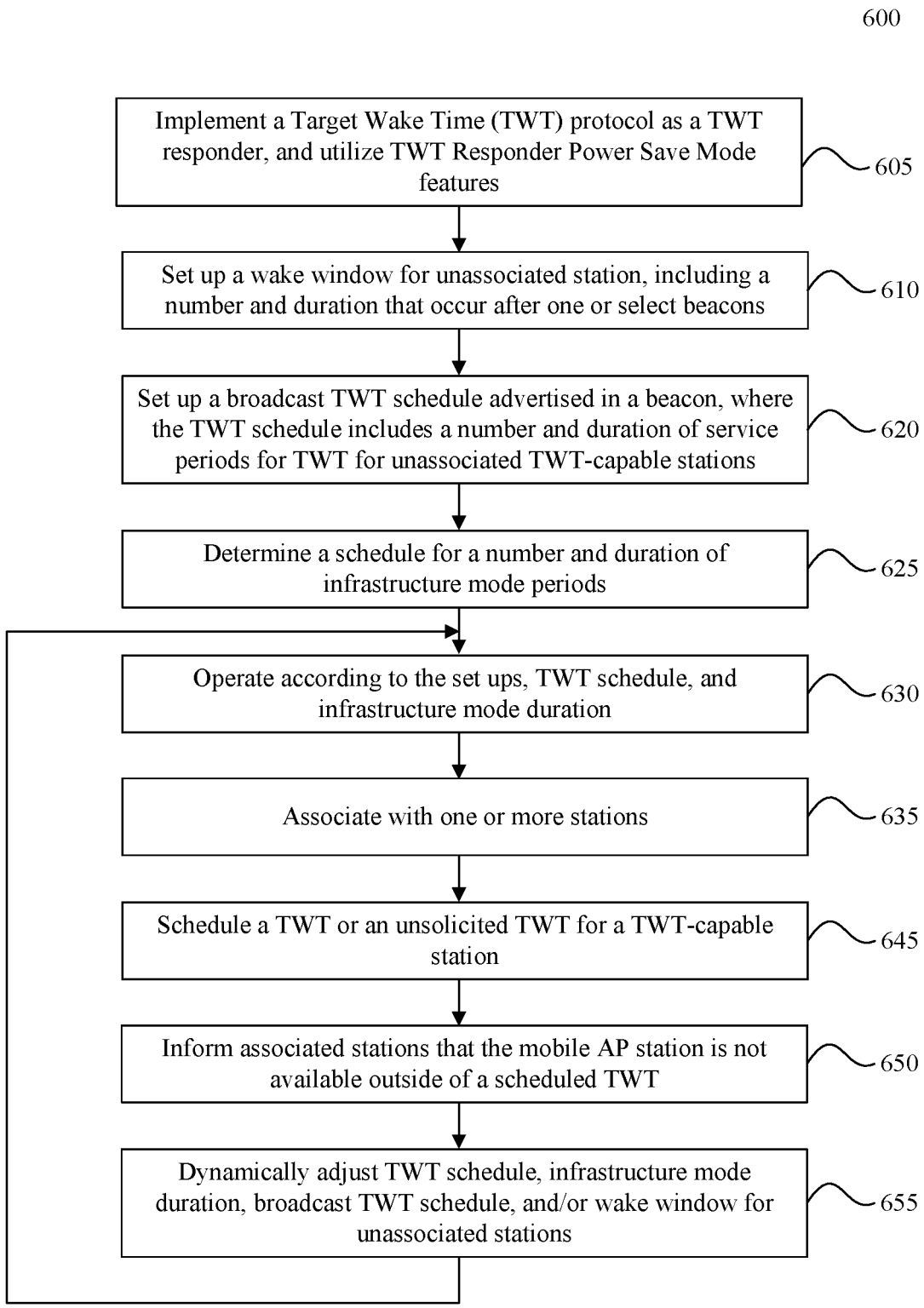
FIG. 6 illustrates an example method for a wireless system supporting a mobile AP station, according to some embodiments of the disclosure.

FIG. 6 illustrates an example method 600 for a wireless system supporting a mobile AP station, according to some embodiments of the disclosure. As a convenience and not a limitation, FIG. 6 may be described with regard to elements of FIGS. 1-5. Method 600 may represent the operation of mobile AP station 150 of FIG. 1 performing always-on soft AP functions and also being able to switch back to infrastructure mode to transmit infrastructure traffic to AP 110 as a station. Method 600 may also be performed by system 200 of FIG. 2 or computer system 1000 of FIG. 10.

At 605, system 200 implements a TWT protocol as a TWT responder, and utilizes TWT Responder Power Save Mode features. Using the TWT protocol enables system 200 to remain in the always-on soft AP mode and concurrently maintain a connection with an AP as a station in an infrastructure mode. For example, mobile AP station 150 may utilize the TWT protocol to: set an individual TWT service period for one or more associated TWT-capable stations 120 to access the WLAN medium via communications 155a-155c, set a time for transmitting infrastructure data to AP 110 as a station via communications 140b, set a time for unassociated devices to communicate with mobile AP station 150, set a time to sleep, and/or set a time to remain awake. Mobile AP station 150 may set up individual TWT with each associated station by: setting and transmitting a specific field in a beacon that indicates that stations are to initiate a TWT setup request with the mobile AP station 150; and/or if the mobile AP station 150 has not received a TWT setup request from an associated station 120, the mobile AP station may set up an unsolicited TWT with a station 120.

In an embodiment, system 200 transmits a high efficiency (HE) Operation Element in a beacon, that instructs receiving stations to request setting up a TWT with mobile AP station 150. In particular, the HE Operation Element includes a TWT Required Field set to "1." As an example, CPU 210 together with instructions stored in memory 235 may set the TWT Required Field of HE Operation Element to "1" enabling system 200 (e.g., mobile AP station 150) to transmit a beacon that includes the HE Operation Element with a TWT Required field set to "1" using the transceiver 220.

At 610, system 200 sets up a wake window for unassociated station, including a number and duration that occur after one or more select beacons. Examples of a wake window for unassociated station include 315 and 345 of FIGS. 3, 415 and 450 of FIG. 4, and 515 and 555 of FIG. 5. The number and duration of wake window for unassociated stations may be dynamically updated based at least on a number of stations that associate with system 200 (e.g., mobile AP station 150.) For example, when there are no stations or few stations associated with mobile AP station 150, then system 200 may increase a number of and/or duration of wake windows for unassociated stations to allow new unassociated stations 120 to join a network of mobile AP station 150. When there are many stations associated with mobile AP station 150, then system 200 may decrease a number of and/or duration of wake windows for unassociated stations to control the number of new unassociated stations 120 that may join the network of mobile AP station 150. A wake window for unassociated station may be scheduled adjacent to a beacon or specific beacons (e.g., 310 and 340, 410 and 445, and/or 510 and 550.)

At 620, system 200 may set up a broadcast TWT schedule advertised in a beacon, where the TWT schedule includes a number and duration of service periods for TWT for unassociated TWT-capable stations. TWT-capable devices that receive the beacon can remain asleep, avoid contention with devices during a wake window for unassociated station 515 of FIG. 5, and wake to associate with mobile AP station 150 at TWT for unassociated TWT-capable stations 545 of FIG. 5.

At 625, system 200 determines a schedule for a number and duration of infrastructure mode periods. Concurrent with maintaining an association with a station (e.g., station 120b) in an always-on soft AP mode, mobile AP station 150 can switch back to infrastructure mode as a station and exchange infrastructure traffic with AP 110. Based on the load and the time critical aspects infrastructure traffic, mobile AP station 150 determines a number and duration of periods for operating as a station to communicate with AP 110. Examples of infrastructure modes include 320 and 330 of FIGS. 3, 420 and 430 of FIG. 4, and 520 of FIG. 5.

At 630, system 200 operates according to the set ups, TWT schedule, and infrastructure mode duration described above. Examples of the operations are described in FIGS. 3-5.

At 635, system 200 associates with one or more stations 120.

At 645, system 200 schedules a TWT or an unsolicited TWT for a TWT-capable station. For example, in response to receiving the beacon, station 120c may initiate a TWT setup request and system 200 responds with an assignment of a TWT service period. Example assignments include 425 and 435 of FIGS. 4 and 525 and 535 of FIG. 5. If system 200 does not receive a TWT setup request from the TWT-capable station (e.g., station 120d) system 200 may schedule an unsolicited TWT for station 120d, e.g., 535 of FIG. 5.

At 650, system 200 informs associated stations that mobile AP station 150 is not available outside of the scheduled TWT. Mobile AP station 150 may arrange to go to sleep outside of a scheduled TWT service period (e.g., sleep modes 530 and 540 of FIG. 5.) There may be less stations associated with mobile AP station 150 than AP 110, thus after TWT schedules are arranged, mobile AP station 150 may have time to go to sleep outside of the scheduled TWT service periods. To arrange to go to sleep outside of a TWT service period, mobile AP station 150 may set TWT Responder Power Save bit during TWT setup. Implementing TWT responder power save mode features enable mobile AP station 150 to reduce power consumption. As an example, system 200 may transmit to an associated station 120 a TWT Element that includes a TWT Responder Power Save field set to "1." CPU 210 together with instructions stored in memory 235 (e.g., a driver) may set the TWT Responder Power Save field of TWT Element to "1" enabling system 200 (e.g., mobile AP station 150) to transmit to an associated station, a TWT Element that includes a TWT Responder Power Save field set to "1." Thus, station 120 will be aware that mobile AP station 150 may go to sleep outside of a TWT service period. Consequently, associated TWT-capable stations 120 may not communicate with mobile AP station 150 outside of their TWT service period. Using the HE Operation Element with the TWT Required Field set to "1" and the TWT Element that includes a TWT Responder Power Save field set to "1," system 200 can set up a TWT with each associated station and may go to sleep outside of a scheduled TWT service period.

At 655, system 200 dynamically adjusts TWT schedule, infrastructure mode duration, broadcast TWT schedule, and/or wake window for unassociated stations. For example, the TWT parameters and durations of time may be adjusted based on a number of stations associated with mobile AP station 150, a traffic load between associated stations 120b-120d and mobile AP station 150, and/or the infrastructure traffic load between the mobile AP station 150 and AP 110. In addition, system 200 dynamically adjusts a number and duration of service periods for wake windows for unassociated stations based at least on the number of stations 120 associated with system 200 (e.g., mobile AP station.) Method 600 returns to 630 and operates accordingly.

Figure 7:
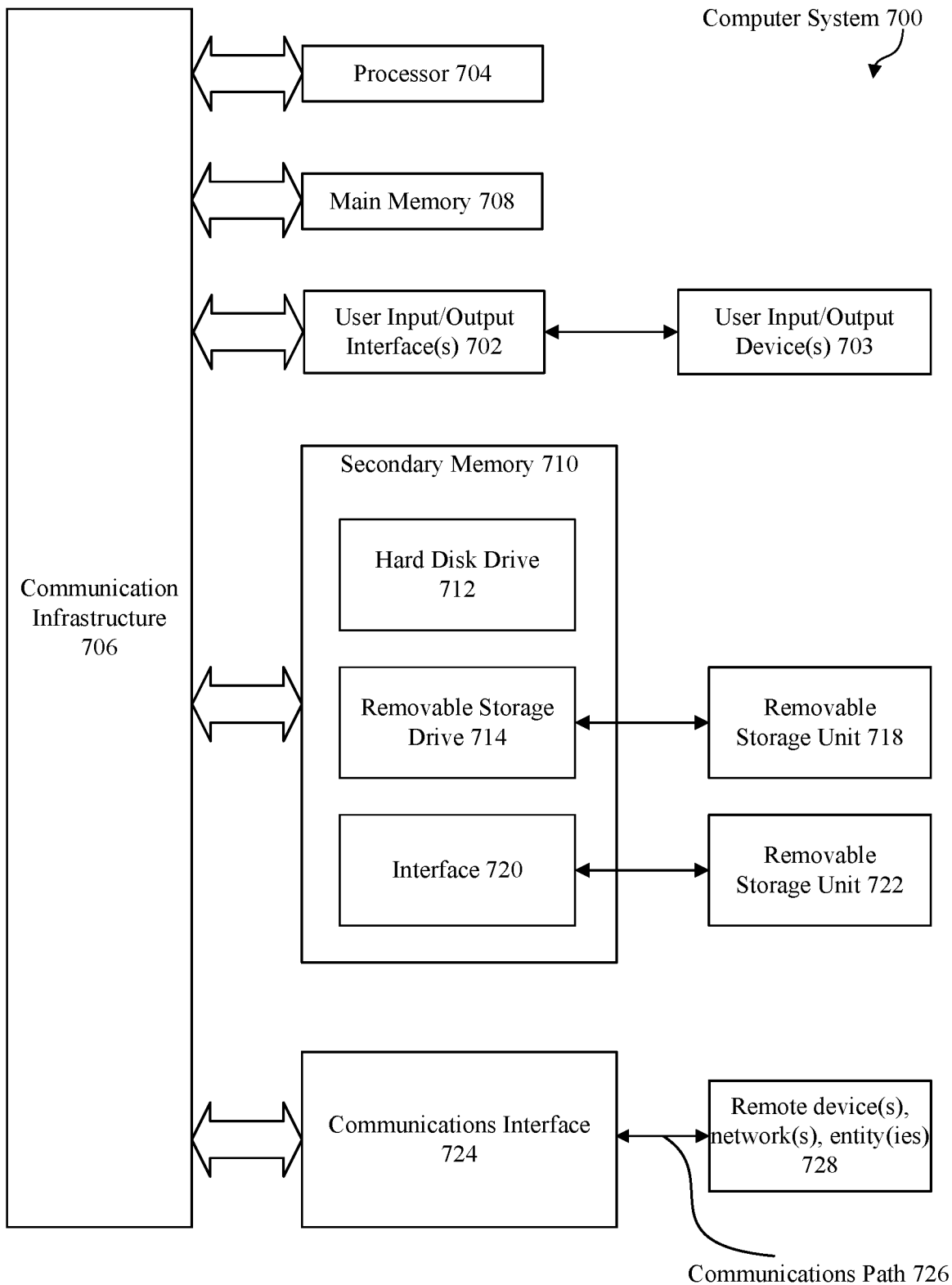
FIG. 7 is an example computer system for implementing some embodiments or portion(s) thereof.

Various embodiments can be implemented, for example, using one or more computer systems, such as computer system 700 shown in FIG. 7. Computer system 700 can be any well-known computer capable of performing the functions described herein such as devices 110, 120, or 150 of FIG. 1. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A mobile access point (AP) station, comprising:
   a transceiver configured to transmit and receive wireless communications; and
   one or more processors communicatively coupled to the transceiver, configured to:
   operate the mobile AP station in an always-on soft AP mode comprising implementing a target wake time (TWT) feature;
   transmit a beacon that is followed by a wake window for stations unassociated with the mobile AP station, wherein the beacon comprises a broadcast TWT schedule that indicates a service period during which one or more TWT-capable stations unassociated with the mobile AP station associates with the mobile AP station;
   while operating the mobile AP station in the always-on soft AP mode, enable a first TWT-capable station to associate with the mobile AP station during the service period, wherein the mobile AP station provides soft AP functionality for the associated first TWT-capable station during a TWT period;
   while the first TWT-capable station is associated with the mobile AP station in the always-on soft AP mode, operate the mobile AP station as a second station in an infrastructure mode associated with an infrastructure AP; and
   transmit, via the transceiver, infrastructure traffic to the infrastructure AP.

2. The mobile AP station of claim 1, wherein the one or more processors are further configured to enable the first TWT-capable station to request setting up the TWT period for the first TWT-capable station.

3. The mobile AP station of claim 2, wherein to enable the first TWT-capable station to request setting up the TWT period, the one or more processors are further configured to:
   set a TWT Required field to a predetermined value in a high efficiency operation element in a second beacon;
   in response to the TWT Required field being set to the predetermined value, receive a TWT setup request from the first TWT-capable station;
   in response to the TWT setup request, transmit a TWT schedule to the first TWT-capable station;
   wherein to inform the first TWT-capable station that the mobile AP station is not available outside of the TWT schedule, set a TWT Responder Power Save field in a TWT Element; and
   transmit the TWT element to the first TWT-capable station.

4. The mobile AP station of claim 2, wherein the one or more processors are further configured to remain active outside of the TWT period for the first TWT-capable station.

5. The mobile AP station of claim 1, wherein the one or more processors are further configured to dynamically adjust the TWT period for the first TWT-capable station based at least in part on a number of stations associated with the mobile AP station or a traffic load between the mobile AP station and one or more stations of the number of stations associated with the mobile AP station.

6. The mobile AP station of claim 1, wherein the one or more processors are further configured to dynamically adjust the wake window for unassociated stations based at least in part on a number of stations associated with the mobile AP station.

7. The mobile AP station of claim 1, wherein the one or more processors are further configured to dynamically adjust the TWT period for the first TWT-capable station based at least in part on a number of TWT-capable stations associated with the mobile AP station.

8. The mobile AP station of claim 1, wherein the one or more processors are further configured to dynamically adjust a duration of the infrastructure mode based at least in part on a traffic load of TWT-capable stations associated with the mobile AP station.

9. The mobile AP station of claim 1, wherein the one or more processors are further configured to dynamically adjust a duration of a next TWT during which a TWT-capable station unassociated with the mobile AP station associates with the mobile AP station based at least in part on a number of TWT-capable stations associated with the mobile AP station.

10. A method for a mobile access point (AP) station, comprising:
    operating in an always-on soft AP mode, wherein the operating comprises implementing a target wake time (TWT) feature;
    transmitting a beacon that is followed by a wake window for stations unassociated with the mobile AP station, wherein the beacon comprises a broadcast TWT schedule that indicates a service period during which one or more TWT-capable stations unassociated with the mobile AP station associates with the mobile AP station;
    while operating the mobile AP station in the always-on soft AP mode enabling a first TWT-capable station to associate with the mobile AP station during the service period, wherein the mobile AP station provides soft AP functionality for the associated first TWT-capable station during a TWT period;
    while the first TWT-capable station is associated with the mobile AP station in the always-on soft AP mode, operating the mobile AP station as a second station in an infrastructure mode associated with an infrastructure AP; and
    transmitting infrastructure traffic to the infrastructure AP.

11. The method of claim 10, further comprising:
    enabling the first TWT-capable station to request setting up the TWT period for the first TWT-capable station.

12. The method of claim 10, further comprising dynamically adjusting the TWT period for the first TWT-capable station based at least in part on: a number of stations associated with the mobile AP station; or a traffic load between the mobile AP station and one or more stations of the number of stations associated with the mobile AP station.

13. The method of claim 10, further comprising dynamically adjusting the wake window for unassociated stations based at least in part on a number of stations associated with the mobile AP station.

14. The method of claim 10, further comprising dynamically adjusting a duration of the infrastructure mode based at least in part on a traffic load of TWT-capable stations associated with the mobile AP station.

15. A non-transitory computer-readable medium storing instructions that, when executed by a processor of a mobile access point (AP) station, cause the mobile AP station to perform operations, the operations comprising:
- operating the mobile AP station in an always-on soft AP mode comprising implementing a target wake time (TWT) feature;
- transmitting a beacon that is followed by a wake window for stations unassociated with the mobile AP station, wherein the beacon comprises a broadcast TWT schedule that indicates a service period during which one or more TWT-capable stations unassociated with the mobile AP station associates with the mobile AP station;
- while operating the mobile AP station in the always-on soft AP mode, enabling a first TWT-capable station to associate with the mobile AP station during the service period, wherein the mobile AP station provides soft AP functionality for the associated first TWT-capable station during a TWT period;
- while the first TWT-capable station is associated with the mobile AP station operating in the always-on soft AP mode, operating the mobile AP station as a second station in an infrastructure mode associated with an infrastructure AP; and
- transmitting infrastructure traffic to the infrastructure AP.

16. The non-transitory computer-readable medium of claim 15, wherein the operations further comprise: enabling the first TWT-capable station to request setting up the TWT period for the first TWT-capable station.

17. The non-transitory computer-readable medium of claim 16, wherein to enable the first TWT-capable station to request setting up the TWT period, the operations further comprise:
- setting a TWT Required field to a predetermined value in a high efficiency operation element in a second beacon;
- in response to the TWT Required field being set to the predetermined value, receiving a TWT setup request from the first TWT-capable station; and
- in response to the TWT setup request, transmitting a TWT schedule to the first TWT-capable station.

18. The non-transitory computer-readable medium of claim 15, wherein the operations further comprise dynamically adjusting the TWT period for the first TWT-capable station based at least in part on: a number of stations associated with the mobile AP station; or a traffic load between the mobile AP station and one or more stations of the number of stations associated with the mobile AP station.

19. The non-transitory computer-readable medium of claim 15, wherein the operations further comprise dynamically adjusting the wake window for unassociated stations based at least in part on a number of stations associated with the mobile AP station.

20. The non-transitory computer-readable medium of claim 15, wherein the operations further comprise dynamically adjusting a duration of the infrastructure mode based at least in part on a traffic load of TWT-capable stations associated with the mobile AP station.

* * * * *